Figure 1:
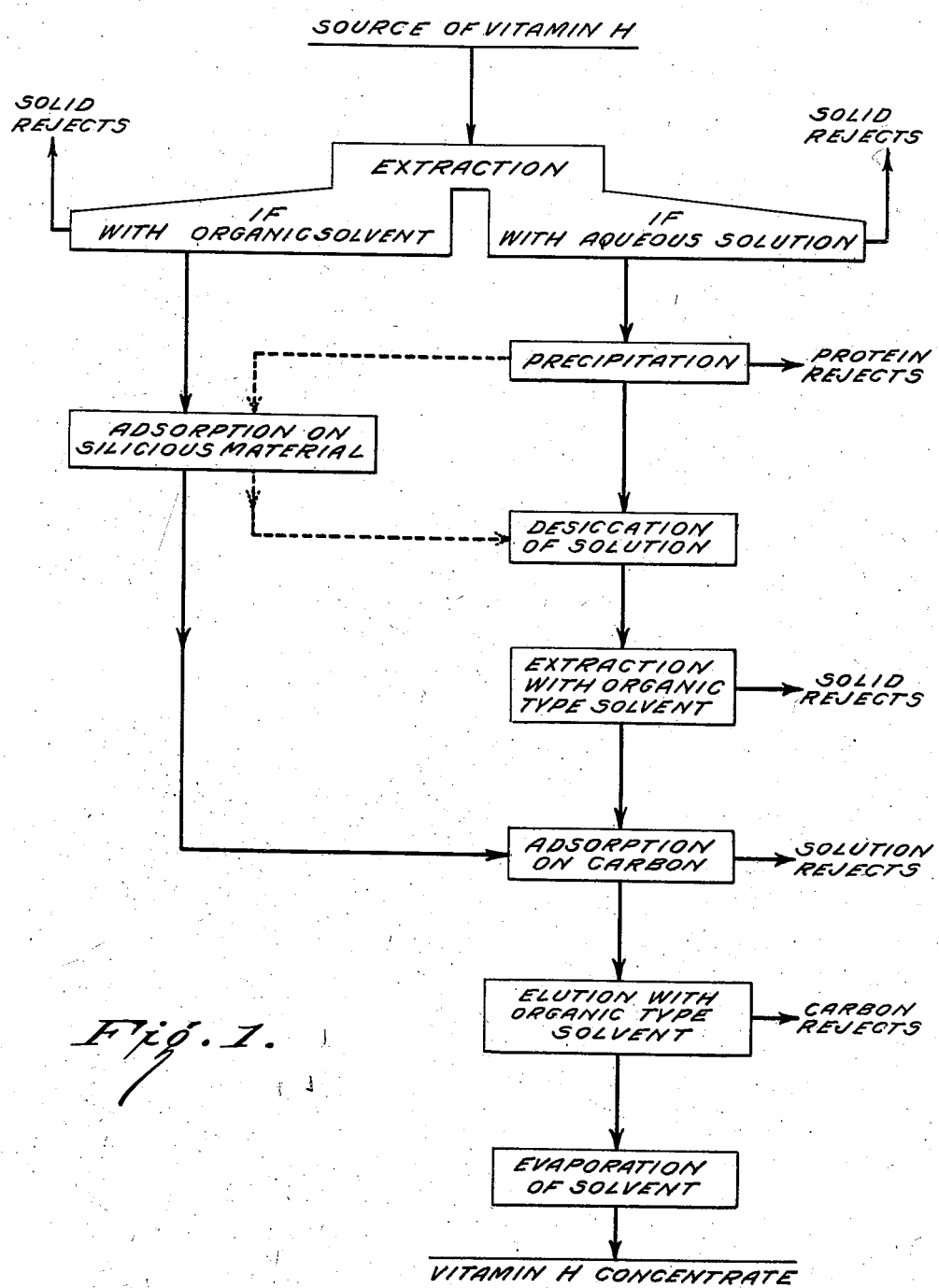

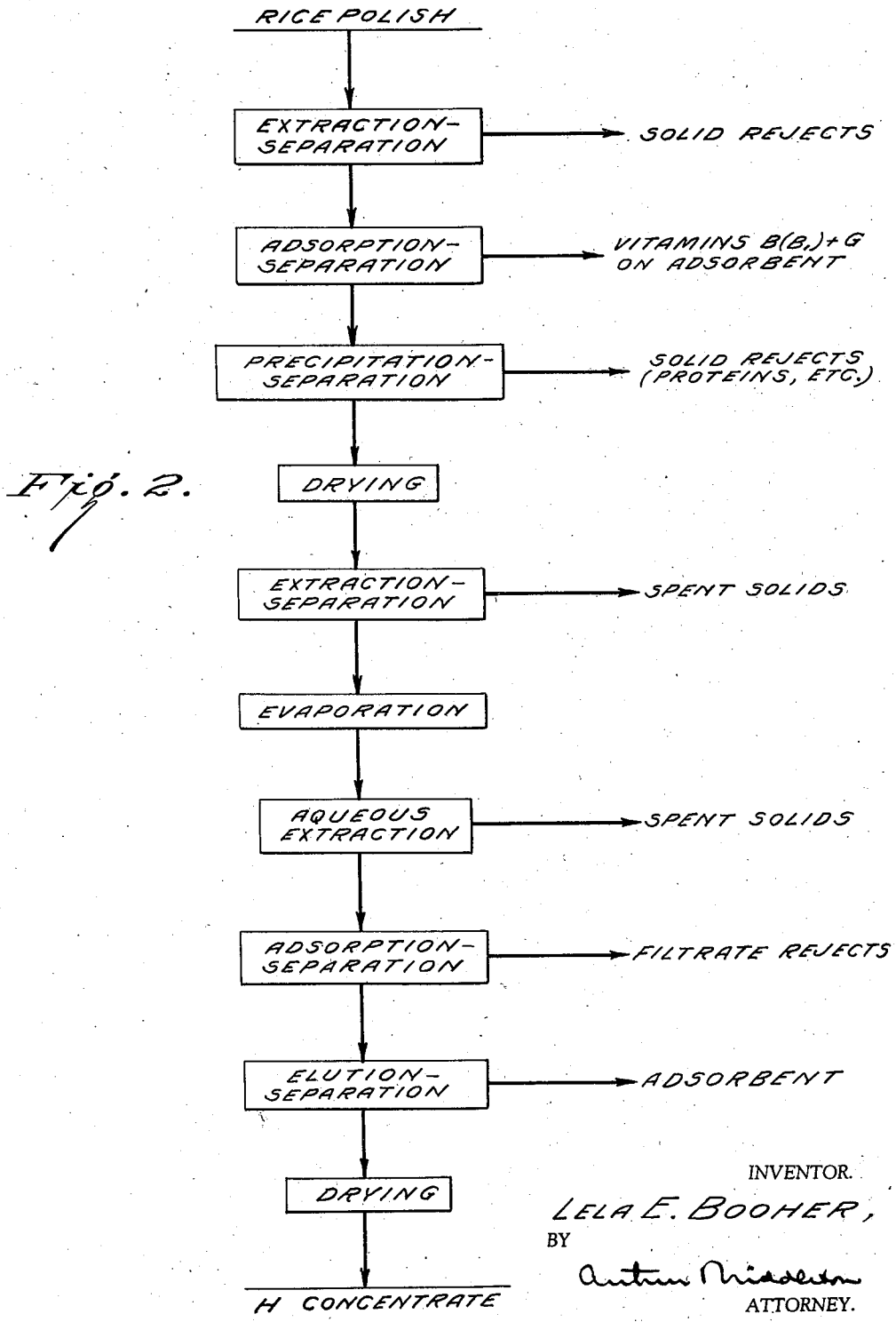

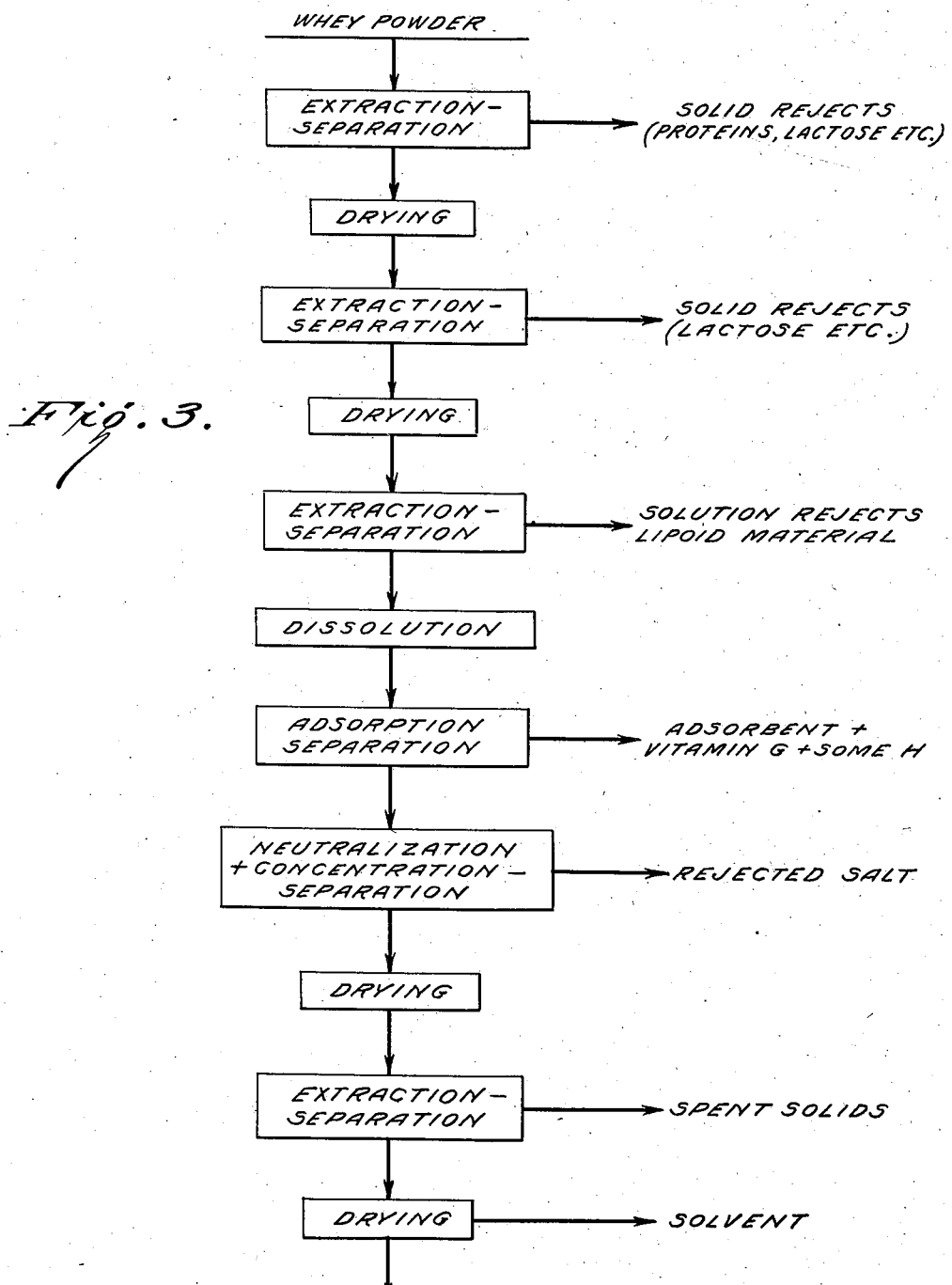

Patented May 28, 1940

2,202,307

UNITED STATES PATENT OFFICE 2,202,307

VITAMIN CONCENTRATION

Lela E. Booher, New York, N. Y.

Application June 20, 1936, Serial No. 86,305

7 Claims. (Cl. 167—81)

This invention relates to factors entering into nutrition and more particularly to the class of substances known as vitamins.

It has been recognized for some time that there are certain organic substances which, along with carbohydrates, fats and proteins, are necessary, at least in small quantities, to nutrition. Such substances as a class are known as vitamins and of these, there have been recognized, identified, and isolated the following: A, B ($B_1$), C, D, E, and G. All of these vitamins are necessary to normal development, health, and growth of human beings as well as of certain animals, and the lack of any one causes definitely detrimental pathological conditions and may ultimately result in death.

These vitamins are normally provided by a well-balanced diet in quantities adequate to avoid such detrimental conditions. However, in some cases, it is important to have a vitamin concentration greater than that obtainable in an ordinary diet, such as for supplying a dietary deficiency; and in extreme cases, for restoring normal conditions where serious pathological disturbances may have already occurred.

For purposes of the present invention, only two of the above known vitamins are of direct interest, vitamin B ($B_1$) and vitamin G. The former, known as the anti-neuritic vitamin, prior to its isolation as a chemical entity, was recognized by its growth-promoting and anti-neuritic properties, as demonstrated upon test animals such as rats and pigeons, and upon human beings. Vitamin G, now chemically identified as flavins, such as lactoflavin, was recognized by its effect in promoting growth and in preventing a skin disease believed by some to be related to pellagra.

This complex comprising vitamins B ($B_1$), G, and certain other unidentified vitamins will be referred to hereinafter as the vitamin B-complex while the pure vitamin B will be referred to as vitamin B ($B_1$).

It is an object of this invention to devise a method for obtaining other unidentified vitamin or vitamins in concentrated form either separate from or together with other known vitamins.

In accordance with this invention, it is found that there is at least one other vitamin present in the vitamin B-complex separate and distinct from the foregoing known vitamins already isolated and that by means of a carefully worked out extraction and adsorption process, such a vitamin or vitamin combination may be separated from the other known vitamins and may be obtained in concentrated form either separate from or together with other vitamins. This new vitamin or vitamin combination will be referred to as vitamin H in accordance with the known nomenclature used by the inventor in an article appearing in the Journal of Biological Chemistry, vol. 119, pages 223-231 (June 1937).

It is found that if test animals, for example, rats, are fed diets adequate in all respects except for the vitamin B-complex, the addition of pure vitamins B ($B_1$) and G does not suffice to replace the vitamin B-complex. There is still a dietary deficiency which in young rats causes general debility and cessation of their growth. It also leads to a disease of the skin similar in gross characteristics to that induced by a lactoflavin (vitamin G) deficiency and in extreme cases, ultimately results in premature death. This is indicative of the presence of a third vitamin or vitamin combination in the vitamin B-complex.

Such a deficient diet, supplemented by vitamins B ($B_1$) and G of the B-complex, used in tests on rats is described under "Method for Determining Vitamin H Values" and has been used in measuring the potencies of foods and food products with respect to the vitamin herein called for convenience vitamin H by determining the amount of H-containing substances which must be added to permit a standard rate of growth in rats, as for example, three to seven grams per week increase in weight of the rat over a reasonable test period, that is, around four weeks.

Because of the relatively high concentration of the vitamin herein called vitamin H contained therein, crude rice polishings, sometimes referred to as rice polish, were used as a basis for comparison of the potencies or concentrations of the various vitamin H-containing materials as well as for experiments in concentration of the vitamin. The vitamin H content of crude rice polish from various sources is sufficiently uniform to use rice polishings as the basis for determining comparative potencies of other food materials.

Using this vitamin H-deficient diet as a starting point, the amount of rice polishings which must be added thereto to permit a standard rate of growth in rats without the appearance of the deficiency disease (skin affliction) is used as the standard for determining the relative potencies or concentrations of the other vitamin H-containing substances or concentrates under examination. For example, if the amount of vitamin H concentrate required to supplement this H-deficient diet is 1/100 of the weight of rice polishings which would be needed to cause the same growth rate with absence of the skin disease, the concentrate is 100-fold more potent than rice polishings. This relative measure of potency is preferable to any definite standard of units for measuring the concentration or potency of the vitamin since units based directly on growth rates have been found to vary in different laboratories according to the breed of rats used for test purposes and specific details of testing. By use of relative potencies based on the potency of some reference product, it is possible to obtain a measure of vitamin H concentration which can be applied in any laboratory, providing of course, that the necessary care in testing is taken.

These relative concentrations are based on a scale of growth units which, in their absolute values may vary according to the breed of rats or other factors, but which give a generally applicable measure of vitamin potency, when used comparatively.

The method of determining what is herein referred to as vitamin H values from which the relative potencies may be determined, is as follows:

*Method for determining vitamin H values*

The method for determining values herein called vitamin H, is based upon a feeding test on rats using the following diet ad libitum:

|   | Per cent |
|---|---|
| Purified casein (extracted with 60% alcohol) | 18 |
| Agar | 2 |
| Salt mixture (Osborne and Mendel) # | 4 |
| Cod liver oil (medicinal grade) | 4 |
| Cornstarch | 4 |

The Osborne and Mendel salt mixture is modified by the addition of copper sulfate.

Vitamin B ($B_1$) is administered daily in amounts of 10–20 micrograms per rat per day; and a highly purified lactoflavin equivalent to 20 micrograms pure lactoflavin per rat per day is administered daily. The vitamin values, herein called vitamin H, are determined by feeding a daily supplement of the product which it is desired to test. When fed a sufficient of the vitamin herein called vitamin H, the rats look normal, while those not fed such supplement show loss of weight and marked loss of hair, they develop severe cases of erythroedemic dermatosis (reddened, edematous skin disease) particularly of the ears and feet, and acquire a flabby muscle-tone. Values of vitamin H, as determined from the growth test are relative compared to growth values obtained with rice polishings, the value of this vitamin in rice polishings being 11 to 14 units and being based on an ordinary growth rate for the breed of rats tested. Other details of this test are described in the article previously referred to.

*Properties and method for separating the vitamin*

The vitamin herein called vitamin H is water soluble, and in natural foods or crude extracts is relatively heat-stable up to 120° C. for 6 hours, and is alkali-labile. In water solution and in acid solution of pH 4.0, the vitamin H activity of crude concentrates thereof was largely retained after heating at 120° C. for five hours. In alkaline solutions of pH 8.0 to 9.0 under the same conditions of heating, the vitamin H activity was to all intents and purposes completely destroyed.

The vitamin herein called for convenience vitamin H does not appear to have the property of pigmentation nor to comprise a pigment and in that respect is outstandingly different from vitamin G which is distinctly yellow in color. Unlike vitamin G, it is not appreciably adsorbed by fuller's earth under conditions of acidity ranging from pH 2.0 to pH 7.0, recovery of vitamin H from the unadsorbed fraction in solutions of such acid concentrations being complete within the limits of experimental error. It has been found that vitamin H occurs in many natural foods—such as whole rice, milk, yeast, wheat, liver, whey, practically all cereals, and possibly in other materials—wherein it is present usually with other known vitamins. In the prevention or cure of pellagra, it has been prescribed that the diet includes such foods—these foods being also rich in other vitamins of the vitamin B-complex.

In carrying out the process of this invention to obtain vitamin H in concentrated form, there may be used any of a number of starting materials containing vitamin H such as those just named. I have found as a very convenient source of the vitamin, an acidulated water extract of rice polishings from which practically all of the vitamin B ($B_1$) had been removed by fuller's earth incident to the Williams-Waterman-Keresztesy method for the isolation of vitamin B ($B_1$). This extract, provided through the courtesy of Merck and Co., had previously been a waste product in the production of vitamin B ($B_1$) and was also found to be practically devoid of vitamin G as well, so it formed a very convenient starting material for the concentration of vitamin H.

The accompanying flowsheets illustrate methods for carrying out the concentration of vitamin H.

Flowsheet 1 shows a generally applicable series of steps for carrying out the process and may be considered as a basic flow sheet.

Flowsheets 2 and 3 respectively, show possible modifications of the basic flowsheet when applied specifically to rice polish and whey as the respective starting materials.

Referring to Flowsheet 1, starting with any of the known sources of the vitamin herein called vitamin H, the vitamin H content thereof, where not already in solution (e. g. milk or the previously mentioned extract) may be put into solution by extraction in aqueous solution, or it may be extracted directly from the dry starting material by means of an organic solvent such as alcohol at elevated temperatures.

In the direct alcohol extraction, proteins are left behind, but in the aqueous extract as yeast or milk, proteins may be present, and where present, they are preferably precipitated out at their iso-electric points by adjusting the pH of the solution. Dilute acid, such for example as hydrochloric or sulfuric acid suitable for use in food preparations, may be used for this extraction or for taking the solution to the iso-electric point of the proteins to be precipitated. Since vitamin H is not stable to alkali, ordinarily alkaline solutions would not be used for the extraction though the presence of ammonia, which is weakly alkaline, would not be detrimental.

The aqueous solution so obtained, after its separation from the precipitate, as by centrifuging or filtration, contains vitamin H and other water solubles which may include particularly vitamins B ($B_1$) and G (depending on the starting material), sugars, salts, etc.—starches, fats, and proteins having been largely eliminated by the previous steps.

If vitamins B ($B_1$) and G are present in either the aqueous solution or the alcohol extract and if it is desired that they be eliminated, they may be removed at this point by adsorption on a suitable silicious mineral substance, sufficiently fine to be effective as an adsorbent, such as diatomaceous earth or Filtercel or silica gel, under suitable conditions of acidity, for example at a pH of around 4.5 of the aqueous solution for maximum adsorption.

Should it be desired to eliminate vitamin B (B₁) and retain vitamin G in the concentrate of vitamin, this may be accomplished by treating the vitamin-containing solids, such as the dried product obtained by evaporation of such an aqueous solution or alcohol extract, with a mixture of alcohol and chloroform, preferably in a ratio of one to two by volume. This treatment with alcohol-chloroform is preferably accompanied by heating.

The separation of vitamins B (B₁) G from H or the freeing of a mixture of vitamins G and H from vitamin B (B₁) may or may not be used in the practice of my process.

The solution remaining after the previous adsorption step, if used or otherwise after the precipitation of the proteins may be neutralized to about pH 7.0 as by caustic soda, barium hydroxide, or other alkali or alkaline earth hydroxide, and any inactive sediment separated, for example, by filtration or centrifuging.

The vitamin H may then be removed directly from the aqueous solution obtained upon separation of the proteins or from the solution remaining from the adsorption by diatomaceous earth, by extraction with suitable solvents mentioned hereafter; by evaporation of the solution to dryness followed by extraction; or by adsorption from the solution on active carbon such for example as the beechwood char commercially known as Norite, although other adsorbent carbons may be used.

The effectiveness of such extraction directly from the solution depends on the inter-facial relationships between the solvent and the solution. Obviously, there are limits to the solvents which may be used for such extraction, mention being made of this possibility as an alternative to the other methods which I have found more generally applicable.

Extraction of the vitamin H from the dried solids mixture may be accomplished by various organic solvents which preferably will satisfactorily extract vitamin H with a minimum of other undesirable substances. Such solvents have been found to include alcohols, ketones, alcohol-hydrocarbon and alcohol-hydrocarbon derivative mixtures.

For example, ethyl alcohol will effectively extract vitamin H at any concentration in water up to and including absolute alcohol, there being an increase in concentration of vitamin extracted with increase in concentration of the alcohol. Methyl, ethyl, propyl, butyl, amyl, etc., including the higher alcohols, may be used as well as acetone and acetic acid-alcohol mixtures. However, the lower alcohols and water carry along so much of impurities that the higher concentrations of the vitamin which are desired are not attained. It is found that vitamin H is more readily concentrated in the higher alcohols or similar, more hydrocarbon-like solvents as will be seen from the examples given later.

I also find that I can remove vitamin H from solution, particularly aqueous, by the use of active charcoal. Since vitamin H is unstable to alkaline conditions, a non-alkaline char such as acid-treated Norite is desirable. The vitamin H can then be removed from the charcoal by elution with ethyl alcohol-benzene, or with higher alcohols or other suitable solvents as referred to herein.

Potencies from 50 to 100 or more times the potency of vitamin H in rice polishings may be obtained by suitable combinations of these steps. For example, I neutralize vitamin B (B₁)-spent filtrate from rice polish, filter out the precipitate, dry the filtrate and extract with alcohol, convert the alcohol extract to aqueous solution, add charcoal, filter out the charcoal, and extract it with butanol. The butanol extract, on evaporation, yields a solid of about 100 times the potency of vitamin H in rice polish.

Many combinations of solvents, alcohols, carbon and the like may be used with many raw materials to produce a more highly concentrated form of vitamin H than has hitherto been produced and where the term concentration or concentrating is used, it may be understood to mean any one or a series of any of the steps of solvent extraction or adsorption on active carbon or any of the possible combinations of such steps as specifically pointed out or indicated herein. The concentrate may be attained in several ways depending upon the raw materials used and upon whether or not essential freedom of the concentrate from other known vitamins is desired. By way of illustration, there are given examples with corresponding flowsheets showing the concentration of vitamin H from, first, rice polish, and second, low lactose whey powder.

*Vitamin H concentration from rice polishings (see Fig. 2)*

I. A particular sample (an ordinary commercial grade) of rice polishings was assayed for its vitamin H content. The air-dried product (moisture content 8.8%) carried 14 vitamin H units per gram. This sample of rice polishings was such as would be employed for the preparation of vitamin B (B₁).

For purposes of concentration of vitamin H, there was used an aqueous acidulated (pH 5.0) extract of rice polishings from which the vitamin B (B₁) had been removed by adsorption on fuller's earth. In one lot of vitamin B (B₁)-spent filtrate (Merck), ten cubic centimeters of the filtrate was equivalent to one gram of rice polish and, in another, ten cubic centimeters of filtrate corresponded to two grams of rice polish.

II. The vitamin B (B₁)-spent filtrate was neutralized with 5-molar sodium hydroxide and evaporated to dryness in lots of five to ten liters. The evaporation was carried out by distillation under reduced pressure (around 200 mm.) to a small volume, followed by further evaporation at room temperature with the aid of an electric fan. The vitamin H value of this air-dried, neutralized vitamin B (B₁)-spent filtrate, I found to be approximately 20 vitamin H units per gram. The product was pigmented brown and carried the salt (sodium sulfate) formed in the process of neutralization.

III. In the course of neutralizing the vitamin B (B₁)-spent filtrate, it was noticed that in the region of pH 6.0 to 7.0, a rather heavy gray-white precipitate was formed and settled out. This precipitate was filtered off on a Büchner funnel and the resultant filtrate was evaporated to dryness as has been described above (II). The precipitate was found to carry only insignificant amounts of vitamin H. The resultant filtrate, if neutralization was with sodium hydroxide, was found to carry 40 units of vitamin H per gram of dry solids. If barium hydroxide was used for the neutralization process and the neutralized solution digested at 60° C. or at room temperature overnight and the precipitate filtered off, the dried solids from the resultant filtrate carried about 43 units of vitamin H per gram. Within the limits of experimental error, the recovery of the vitamin H from the vitamin B ($B_1$)-spent filtrate at this stage was almost 100 percent.

IV. *Example a.*—Extraction with 80% ethyl alcohol:

35 grams of air-dried solids obtained from the vitamin B ($B_1$)-spent filtrate (neutralized with sodium hydroxide) were successively extracted with 140, 140, and 140 cc. respectively of 80% (by weight) ethyl alcohol. The extractions were carried out at room temperature and during the extraction they were kept constantly agitated by use of a mechanical shaker. Each successive extraction with 80% ethyl alcohol involved shaking the extraction system for 30 min. The extracts were removed by filtration on a small Büchner. The combined extracts were concentrated by reduced pressure (about 100 mm.) to a volume of about 10 cc. and further dried over sulfuric acid. The dried extract thus prepared was found to carry 60 units of vitamin H per gram and no appreciable amounts of vitamin B ($B_1$) or G. About 95% of the vitamin was recovered in the 80% alcohol extract.

IV. *Example b.*—Extraction with absolute alcohol:

50 grams of dried solids obtained from the vitamin B ($B_1$)-spent filtrate (after neutralization with sodium hydroxide followed by filtration) were successively extracted with 200, 200, and 200 cc. respectively of absolute ethyl alcohol for 30, 30, and 30 minutes respectively. The extractions were carried out at room temperature in bottles attached to a mechanical shaker. The extracts were removed by filtration on a small Büchner. The combined filtrates were distilled under reduced pressure (about 100 mm.) to a few cc. and finally dried over sulfuric acid. This dried product was taken up in about 5 cc. of water, acidulated with a few drops of glacial acetic acid, centrifuged, the solution decanted and dried in a desiccator. The dried product was found to carry approximately 200 vitamin H units per gram and no appreciable amounts of vitamins B ($B_1$) or G. The product was somewhat pigmented (brown) and deposited small elongated, bevelled, colorless crystals usually crossed at right angles to each other or in rosettes.

IV. *Example c.*—Adsorption on charcoal:

25 grams of dried solids obtained from the vitamin B ($B_1$)-spent filtrate (after neutralization with sodium hydroxide followed by filtration) were extracted with absolute alcohol under the same conditions and use of the same proportions of alcohol as already described under IV (Example b). This product was dissolved in 100 cc. of distilled water. To this solution was added 500 milligrams of Norite (previously leached with 1% acetic acid and dried overnight in an oven at 100° C.). After several hours contact with the Norite, the solution was filtered off on a Büchner funnel. The Norite was shaken up with 50 cc. of absolute alcohol and 50 cc. of benzene and allowed to stand overnight. The flask in which this system stood was fitted with a reflux condenser and the contents of the flask heated to boiling on a water-bath for 10 minutes. The carbon was filtered off from the hot solution on a small Büchner funnel. The benzene-alcohol mixture (i. e. the filtrate) was removed by distillation, more alcohol and water being added in order to remove all the benzene. The concentrated product was dried over sulfuric acid. The product when dry was tinged with yellow and was quite brittle. The vitamin H activity of this product was found to be approximately 800 units per gram of dry solids.

*Vitamin H concentrate from low lactose whey powder (see Fig. 3)*

I. The low lactose whey powder samples used carried on the order of five growth units of vitamin H per gram of air-dried whey.

II. Boiling ethyl alcohol extraction:

500 grams of air-dried low lactose whey powder were extracted successively with 2000, 1250, 750, and 750 cc. of boiling 93–94% (by weight) ethyl alcohol for 30, 30, 15, and 15 min. respectively with frequent or continuous agitation of the flask. The hot extracts were removed each time by filtration using a Büchner funnel. The combined extracts were chilled and filtered and evaporated to a small volume by distillation under reduced (order of 20 cms.) pressure. Distillation was further continued in a desiccator type flask until the extract was a very thick viscous mass. This product was finally dried over sulfuric acid. The yield of dried product at this stage was on the order of 45 grams from 500 grams of the whey powder. The product was bright yellow (due to concentration of the lactoflavin) and carried about 12 growth units of vitamin H per gram. Vitamin G was present but no appreciable amounts of vitamin B ($B_1$).

III. Chloroform-alcohol extraction:

The dried solids from the boiling alcohol extract were extracted with a mixture of chloroform and ethyl alcohol (in ratio of two to one by volume). The alcohol extractives from 3 kilograms of the whey powder (about 250–300 grams of extractives) were intimately mixed with a good grade of cornstarch to facilitate solvent penetration and extracted successively with 1800, 900, and 900 cc. respectively of the chloroform-alcohol solvent mixture for 30, 20, and 20 minutes respectively. The extraction was conducted in a five liter flask fitted with a reflux condenser and the system heated on a steam bath. The hot extracts were filtered off using a Büchner funnel and the combined extracts were evaporated to dryness using first a distillation and finally a desiccation (over sulfuric acid) process. This product yielded about 75–90 grams of highly pigmented (due to concentration of lactoflavin) product containing some lactose and much lipoidal material and carrying 40–85 growth units of vitamin H per gram as well as substantial amounts of vitamin G.

IV. Aliquots of the dried solids from the chloroform-alcohol extraction were extracted with dry diethyl ether (in some cases petroleum ether was used) in a Soxhlet apparatus for several hours. This step was intended to remove the lipoids. By test it was shown that a portion of the vitamin H was carried along by the ether extract. The ether-extracted residue carried from 60 to 85 growth units of vitamin H per gram and also contained vitamin G.

V. Adsorption procedure:

5 grams of the ether-extracted residue were suspended in 300 cc. distilled water. To this was added 300 cc. of water containing 53 cc. of 36% hydrochloric acid followed by 17 grams of Lloyd's reagent (a type of fuller's earth). This adsorption system was shaken and in a very few minutes practically all the lactoflavin (yellow-green fluorescent pigment of whey, now identified as vitamin G) was adsorbed on the Lloyd's reagent. The Lloyd's reagent was separated by centrifugation. The equilibrium (supernatant liquid) solution was neutralized with alkali (sodium hydroxide) and concentrated to a small volume by distillation under reduced pressure (around 100 mm.). A heavy deposit of sodium chloride separated and was filtered off using a Büchner funnel. The filtrate (now about 150 cc. volume) was further dried using a fan at room temperature followed by desiccation over sulfuric acid. There was obtained a product at this stage carrying according to the previously described method of testing, about 85 growth units of vitamin H per gram of dry solids and practically free of lactoflavin (vitamin G).

VI. Extraction of the desiccated filtrate, which was the unadsorbed fraction:

The desiccated filtrate (representing a little less than 600 cc. of the adsorption equilibrium solution) was extracted with absolute alcohol using several 25 cc. portions successively. This extraction was made at room temperature with agitation of the system. The alcohol was largely removed by distillation, the concentrated extract filtered and finally dried over sulfuric acid. There was obtained at this stage a product carrying 160 to 200 growth units of vitamin H per gram of dry solids. The product was somewhat waxy in character and deposited in the course of drying a crop of small colorless sword-shaped crystals which appeared in the form of rosettes or right angle crossed crystals. This product did not carry any detectable (by method of rat tests) amount of vitamin G. From later experience, it is apparent that there could have been used for the extraction at this stage such solvents as acetone, butyl alcohol, amyl alcohol, etc. and probably have been obtained a product of as great or greater vitamin H potency.

*Effect of insufficiency of the vitamin herein called vitamin H in the diet*

An absence or insufficiency of the vitamin herein called vitamin H in the diet induces:

I. In experimental rats—
(a) A cessation of growth or loss in weight.
(b) A marked loss of hair—general or localized.
(c) Erythroedemic dermatosis (reddened, edematous skin disease) of the ears and feet—sometimes shedding of toes.
(d) A loss of normal muscle tone—flabby musculature.
(e) Soreness around the mouth.
(f) In prolonged deficiency, death of the rat.
(g) Nervous disorders.

II. The vitamin herein called vitamin H may be the sole or a contributory factor in the prevention and cure of black-tongue (a dietary deficiency disease) in dogs. A concentrate of vitamins G and H together prepared by me from whey powder was found to prevent or cure experimental black-tongue in dogs.

III. By reason of the analogies of human pellagra, black-tongue in dogs, and the erythroedemic dermatosis in rats, it is highly probable that vitamin H is the sole or a contributing factor in the prevention and cure of human pellagra. This is substantiated by the fact that diets carrying liberal quantities of vitamin G and H have been found to prevent human pellagra. A condition similar to human pellagra has been observed in some chronic alcoholics and would therefore indicate the possibility of the use of vitamin H or of vitamins G and H to alleviate these signs of chronic alcoholism.

Signs of erythroedemic dermatosis very similar to that observed in vitamin H-deficient rats have been noted in certain cases of faulty infant-feeding. These signs have been alleviated by the use of foods or food products wherein the richness in vitamin H or in vitamins G and H together would seem the most likely effective agents. This disease in infants could be designated by the term acrodynia.

In human pellagra, human acrodynia, and black-tongue in dogs, the gastro-intestinal disturbances or loss of appetite make it especially desirable to have a concentrate containing substantial amounts of vitamin H for purposes of medication.

It is now possible to obtain the vitamin in sufficiently concentrated form to be of practical value as a dietary supplement or, in the treatment of extreme cases of the disease where loss of appetite might have made the introduction of the vitamin by the usual food sources impossible, where the administration of the vitamin in highly concentrated form by mouth or possibly by means of injections might be essential.

Further, the discovery of and the demonstration of how to concentrate the vitamin apart from other vitamins is a long step in the direction of chemically identifying this new vitamin.

While there have been described only a few embodiments of this invention, it is to be understood that various combinations of steps are possible as indicated above and that the scope of this invention is not to be limited to the examples above given.

I claim:

1. In a process for the preparation of a vitamin bearing concentrate in which factors of the vitamin B-complex other than vitamins B ($B_1$) and G (flavin) are primarily concentrated, the steps of adsorption of the vitamin from an aqueous solution thereof with a non-alkaline activated carbon, separation of the carbon, and elution of the vitamin therefrom at an elevated temperature with a solvent selected from a group consisting of alcohols, benzene-alcohol, and acetone.

2. In a process for the preparation of a vitamin bearing concentrate in which factors of the vitamin B-complex other than vitamins B ($B_1$) and G (flavin) are primarily concentrated, the steps of extraction of material containing such vitamin with a suitable solvent selected from a group consisting of alcohols, acetone, and ethanol-acetic acid, conversion to an aqueous solution, adsorption of the vitamin from said aqueous solution with a non-alkaline activated carbon, separation of the carbon, and elution of the vitamin therefrom at an elevated temperature, with a solvent selected from a group consisting of alcohols, benzene-alcohol, and acetone.

3. A process of preparing a vitamin-bearing concentrate in which factors of the vitamin B-complex other than vitamins B ($B_1$) and G (flavin) are primarily concentrated, which comprises extracting source material with a solvent selected from a group consisting of alcohols, acetone, and ethanol-acetic acid, rejecting the solids therefrom, evaporating the solution, making an aqueous solution from the residue, treating the aqueous solution with a non-alkaline activated carbon whereby the greater part of the desired vitamin factors are adsorbed, separating the carbon from the aqueous solution, and eluting the vitamin in concentrated form from the carbon at an elevated temperature with a solvent selected from a group consisting of alcohols, benzene-alcohol, and acetone.

4. A process of preparing a vitamin-bearing concentrate in which factors of the vitamin B-complex other than vitamins B ($B_1$) and G (flavin) are primarily concentrated, which comprises extracting source material with an aqueous solvent, rejecting the solids therefrom, precipitating proteins from the aqueous solution by adjusting the pH of the solution to their isoelectric point, separating the solution, evaporating the solvent therefrom, extracting the residue with a solvent selected from a group consisting of alcohols, acetone, and ethanol-acetic acid, separating the solids therefrom, evaporating the solvent from the extract, and making an aqueous solution from the residual solids, treating the aqueous solution with activated carbon whereby the greater part of the desired vitamin factors are adsorbed, separating the carbon from the aqueous solution, and eluting the vitamin in concentrated form from the carbon at an elevated temperature with a solvent selected from a group consisting of alcohols, benzene-alcohol, and acetone.

5. A process of preparing a vitamin-bearing concentrate in which factors of the vitamin B-complex other than vitamins B ($B_1$) and G (flavin) are primarly concentrated, which comprises extracting source material with an aqueous solvent, rejecting the solids therefrom, precipitating proteins from the aqueous solution by adjusting the pH of the solution to their isoelectric point, separating the solution, treating the solution at a suitable pH with a silicious adsorbent whereby quantities of vitamins G and B ($B_1$) are adsorbed, separating the vitamin-containing adsorbent, treating the remaining solution with activated carbon whereby the greater part of the desired vitamin factors are adsorbed, separating the carbon from the aqueous solution, and eluting the vitamin in concentrated form from the carbon at an elevated temperature with a solvent selected from a group consisting of alcohols, benzene-alcohol, and acetone.

6. A process of preparing a vitamin-bearing concentrate in which factors of the vitamin B-complex other than vitamins B ($B_1$) and G (flavin) are primarily concentrated, which comprises extracting source material with an aqueous solvent, rejecting the solids therefrom, precipitating proteins from the aqueous solution by adjusting the pH of the solution to their isoelectric point, separating the solution, treating the solution with activated carbon whereby the greater part of the desired vitamin factors are adsorbed, separating the carbon from the aqueous solution, and eluting the vitamin in concentrated form from the carbon at an elevated temperature with a solvent selected from a group consisting of alcohols, benzene-alcohol, and acetone.

7. A process of preparing a vitamin-bearing concentrate in which factors of the vitamin B-complex other than vitamins B ($B_1$) and G (flavin) are primarily concentrated, which comprises extracting source material with an aqueous solvent, rejecting the solids therefrom, treating the solution with a silicious adsorbent whereby quantities of vitamins G and B ($B_1$) are adsorbed, separating the vitamin-containing adsorbent, evaporating the solvent from the remaining aqueous solution, extracting the evaporation residue with a solvent selected from a group consisting of alcohols, acetone, and ethanol-acetic acid, rejecting the solids therefrom, evaporating the solution remaining, making an aqueous solution from the evaporation residue, treating said last-named aqueous solution with a non-alkaline activated carbon whereby the greater part of the desired vitamin factors are adsorbed, separating the carbon from the aqueous solution, and eluting the vitamin in concentrated form from the carbon at an elevated temperature with a solvent selected from a group consisting of alcohols, benzene-alcohol, and acetone.

LELA E. BOOHER.